Oct. 13, 1931.   R. J. BELL   1,826,918
FASTENING MEANS FOR METAL BARRELS
Filed June 29, 1929
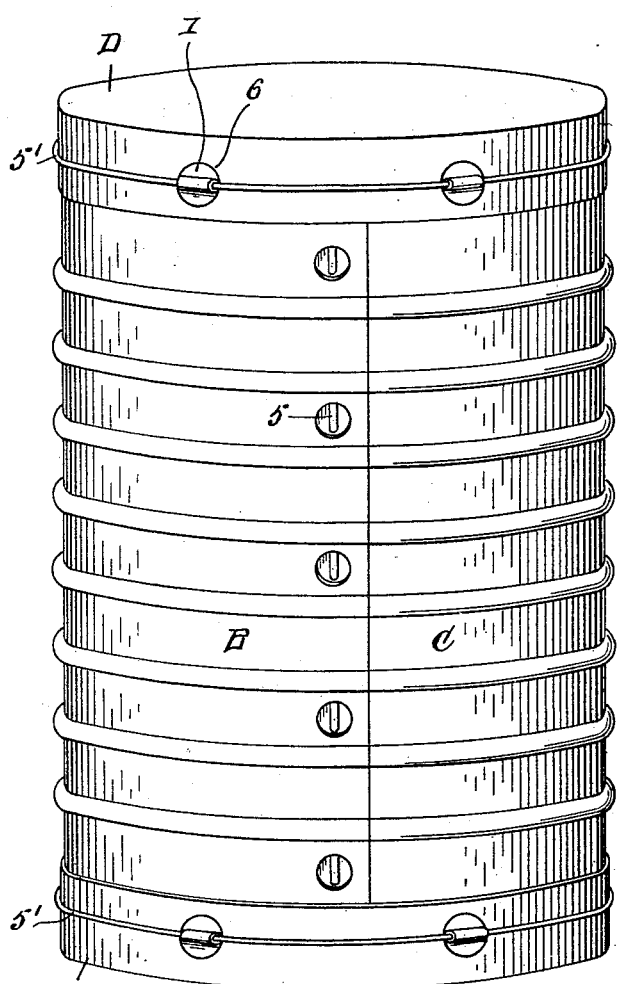
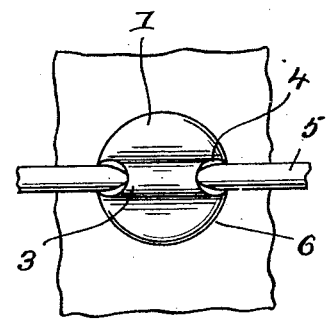
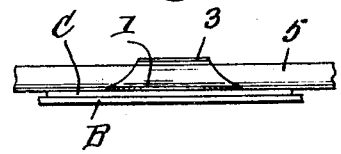
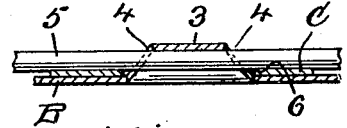
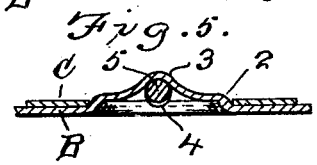
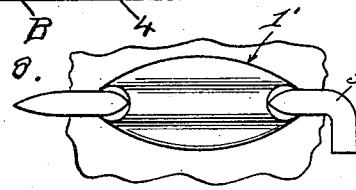
R. J. Bell
INVENTOR
BY Victor J. Evans
ATTORNEY Patented Oct. 13, 1931

1,826,918

UNITED STATES PATENT OFFICE

ROBERT J. BELL, OF JACKSONVILLE, FLORIDA, ASSIGNOR TO R. J. BELL COMPANY, INC., OF JACKSONVILLE, FLORIDA, A CORPORATION OF FLORIDA

FASTENING MEANS FOR METAL BARRELS

Application filed June 29, 1929. Serial No. 374,811.

This invention relates to means for detachably fastening one part to another part, the invention being mainly designed for fastening sections of a metal barrel together, the general object of the invention being to provide a plurality of teats in one part for passing through holes in another part, each teat having a rib or raised portion thereon terminating in openings so that a rod or other member can be passed through the teats to connect the two parts together. By forming the teats as described, there is no danger of the dies cutting the metal or other material from which the teat is formed.

The invention is also designed for connecting together sections of kegs, boxes and other containers of any shape or size.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view of a barrel, the connecting means between the parts of which are constructed in accordance with the invention.

Figure 2 is a fragmentary view showing one of the teats passing through a hole in another part, with a wire or rod passing through the holes in the teat.

Figure 3 is an edge view of Figure 2.

Figure 4 is a sectional view through Figure 2, with the rod or wire in elevation.

Figure 5 is a sectional view taken at right angles to Figure 4.

Figure 6 is a sectional view through the teat portion of one of the parts.

Figure 7 is a sectional view through one of the hole carrying portions of a part.

Figure 8 is a fragmentary view showing a modification.

As shown in these views, each teat A is formed by pressing the metal or other material to form a teat having a substantially flat top part 1, with a flange 2 connecting the top part with the sheet B, this flange slightly tapering from the point of connection with the sheet to the cover part 1 and an elongated rib 3 is formed at the center of the top part 1 which is rounded so that its edges merge into the said top part, as shown. A pair of holes 4 is formed in the metal before the teat is formed and after the teat is formed, these holes are arranged at the ends of the rib or raised portion 3. In other words, the raised portion is formed from that part of the metal between the two holes so that the raised portion and the two holes form a passage through the teat whereby a rod or wire 5 can be passed through the teat. The other sheet or part C which is to be connected with the teat carrying part is formed with a plurality of large holes 6 through which the teats extend, as shown in Figures 2, 3, 4 and 5, so that when the member 5 is passed through the teat, it will lock the two parts B and C together.

Figure 1 shows a barrel composed of the two sections B and C, the edges of which are connected together by inwardly extending teats through which the rods 5 pass, it being understood that a rod is passed through each set of teats, there being two sets of teats for connecting the two sections B and C together. Outwardly extending teats are formed in the ends of the barrel and are adapted to pass through large holes formed in the caps D so that by passing a wire 5' around the caps and through the teats, the caps are detachably connected with the barrel.

The teats and its receiving hole may be formed of oblong shape, as shown at 1' in Figure 8, with a short rod 5' for connecting the parts together.

Thus it will be seen that I have provided simple means for detachably connecting the two sections of a barrel together and for connecting the end caps to the barrel and as before stated, by forming each teat as above described, there is no danger of the dies cutting the metal in the formation of the teats.

While the invention is mainly designed for use with metal articles, it will, of course, be understood that it may be used with articles formed of other materials, such as fibre paper or composition, and it will also be understood that the teats can be so arranged that the rod or rods can be arranged outside of the barrel as well as inside.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A barrel composed of two semi-circular portions and a pair of caps, each semi-circular portion having a row of teats adjacent one side edge thereof and a row of teats adjacent each end thereof and a row of holes adjacent the other side edge, the holes of one section receiving the teats of the other section, each teat having a substantially flat top with a raised center forming a rib and each teat having a pair of holes therein, one at each end of the raised portion or rib, rods passing through the holes in the teats for detachably connecting the sections together and closely engaging the adjacent section and each cap having holes in its flanges for receiving the teats at the ends of the sections and a wire passing around the flange of each cap and through the holes in the teats and closely engaging the cap flange for detachably connecting the cap to the body.

2. Means for connecting a pair of overlapping members, one of which is provided with an opening, a flat faced teat formed in and extending from the other member and having an outline conforming to the opening and a depth equal to the height of the teat, whereby the teat may be inserted within said opening with its flat face substantially flush with the adjacent face of the member having the opening, a diametrically disposed transversely curved rib extending from the flat face of the teat and having an opening at each end defining an open ended restricted passage, and a rod removably positioned within and engaging the walls of the passage and the adjacent face of the first referred to member to bind the latter into close contact with the rib carrying member and hold said members against relative independent movement under stress.

In testimony whereof I affix my signature.

ROBERT J. BELL.